United States Patent

[11] 3,570,786

| [72] | Inventor | Richard B. Lewis II<br>Sepulveda, Calif. |
|---|---|---|
| [21] | Appl. No. | 848,264 |
| [22] | Filed | Aug. 7, 1969 |
| [45] | Patented | Mar. 16, 1971 |
| [73] | Assignee | United Aircraft Corporation<br>East Hartford, Conn. |

[54] CONTROL APPARATUS AND METHOD FOR OPERATING AN AIRCRAFT
20 Claims, 4 Drawing Figs.

[52] U.S. Cl. .................................................. 244/17.13,
244/17.19, 416/98, 416/115, 416/130
[51] Int. Cl. ....................................................B64c 27/34,
B64c 27/44
[50] Field of Search........................................ 244/17.11,
17.13, 17.19, 17.21, 17.23, 17.25, 7; 416/98,
112—115, 120, 127, 130

[56] References Cited
UNITED STATES PATENTS
2,606,622   8/1952   Bates............................   416/114

| 3,031,017 | 4/1962 | Arcidiacono.................. | 416/114 |
| 3,109,496 | 11/1963 | Ellis et al...................... | 416/98X |
| 3,199,601 | 8/1965 | Dean et al...................... | 416/130X |
| 3,409,249 | 11/1968 | Bergquist et al.............. | 244/17.13 |

Primary Examiner—Milton Buchler
Assistant Examiner—Paul E. Sauberer
Attorney—John C. Linderman ABSTRACT: A control device and method for operating an aircraft having rigid lifting rotors in which the rotor blades can carry steady offset lift vectors. The blades of the rotors are adjustable cyclically so that the thrust vector can be offset laterally and are adjustable collectively to vary the magnitude of the thrust vector. Collective-to-lateral coupling is provided which renders the lateral cyclic pitch a function of collective pitch. Above a given transition speed, collective pitch is held constant for straight-and-level flight. Maneuvering at high speed is performed by operating the cyclic stick along or in conjunction with an auxiliary propulsion device in the same manner as in fixed wing aircraft.

CONTROL APPARATUS AND METHOD FOR OPERATING AN AIRCRAFT

BACKGROUND OF THE INVENTION

This invention relates to the field of aircraft controls and is more particularly directed to apparatus and method for operating aircraft with rigid lifting rotors.

Recent developments in the aircraft field have suggested that several advantages can be gained from a rigid rotor system in which the blades are connected to a rotor hub without hinges or flexing members. With such rotors, blade flapping is inhibited and with three or more blades, it is possible to carry steady, resultant thrust vectors which are offset from the rotor axis. This capability permits the rigid rotor to take advantage of the dissymmetry of the relative wind along the blades of a rotating rotor advancing through the air. The advancing blades, those blades on one side of the rotor moving generally in the direction of flight, are capable of much greater lift than the retreating blades, those blades on the opposite side of the rotor moving generally in a direction opposite to the direction of flight. When the advancing blades are permitted to carry a lift more commensurate with their capacity rather than be restricted to a lift equal to that carried by the retreating blades, the resultant rotor thrust vector will be laterally offset on the advancing blades. A helicopter with rigid rotors employing this advancing blade concept and a method of flying such a helicopter are more completely described in U.S. Pat. No. 3,409,249, issued Nov. 5, 1968 to Bergquist et al.

As taught in the referenced patent, an optimum lift-to-drag ratio for a rigid rotor system can be obtained by precisely coordinating the amount of lift vector offset with the advance ratio of the rotor. Such a system either imposes additional burdens on the pilot or requires special apparatus to independently introduce the correct amount of lateral cyclic pitch to each of two coaxial rigid rotors as a function of advance ratio. In this respect, the term lateral cyclic pitch refers to that cyclic pitch which creates a roll moment about the longitudinal axis of the aircraft and, correspondingly, longitudinal cyclic pitch refers to that cyclic pitch which creates a pitching moment about the lateral axis of the aircraft. Such special apparatus is necessary for a precise control of the lift vector offset; however, it is desirable to employ the basic principles of the system without depending upon such sophistication in the actual hardware of the system.

It has been found that a greatly simplified system can be employed to obtain the substantial benefits of the advancing blade concept without the sophistication suggested in the referenced patent.

SUMMARY OF THE INVENTION

This invention relates to the control of rigid rotors capable of carrying offset lift vectors and represents an improvement in the method and apparatus to achieve the benefits of operating lifting rotors with steadily offset lift vectors.

More particularly, the invention concerns the control apparatus which renders the lateral cyclic pitch dependent upon the collective pitch of the rotor blades. Apparatus is disclosed which automatically adjusts the lateral cyclic pitch as a function of the collective pitch. The functional relationship is a nondirect proportionality. The adjustment is accomplished by a coupling or mixing mechanism. The standard lateral and longitudinal cyclic pitch control commands from the pilot can be superimposed on any of the mixed signals to obtain the conventional rolling or pitching moments for aircraft maneuvering.

In addition, the invention also contemplates a locking or detent mechanism which holds the collective pitch of the rotor blades and consequently the coupled lateral cyclic component constant at a preselected transition speed into high speed flight. Above this transition speed, an auxiliary forward propulsion device is the dominant forward speed controller. At higher speeds, maneuvering can be accomplished in a manner similar to a fixed wing aircraft by means of the conventional cyclic pitch control stick and the auxiliary propulsion device.

The invention can be incorporated in any aircraft having a rigid rotor system. Such an aircraft may incorporate a single rigid rotor which is operated in conjunction with a fixed wing surface. The fixed wing generates an equal and opposite rolling moment to cancel the rolling moment created by the offset lift vector of the rotor system. The invention can also be employed in aircraft having coaxial or offset rotor systems.

DESCRIPTION OF THE PREFERRED EMBODIMENTS

Figure 1:
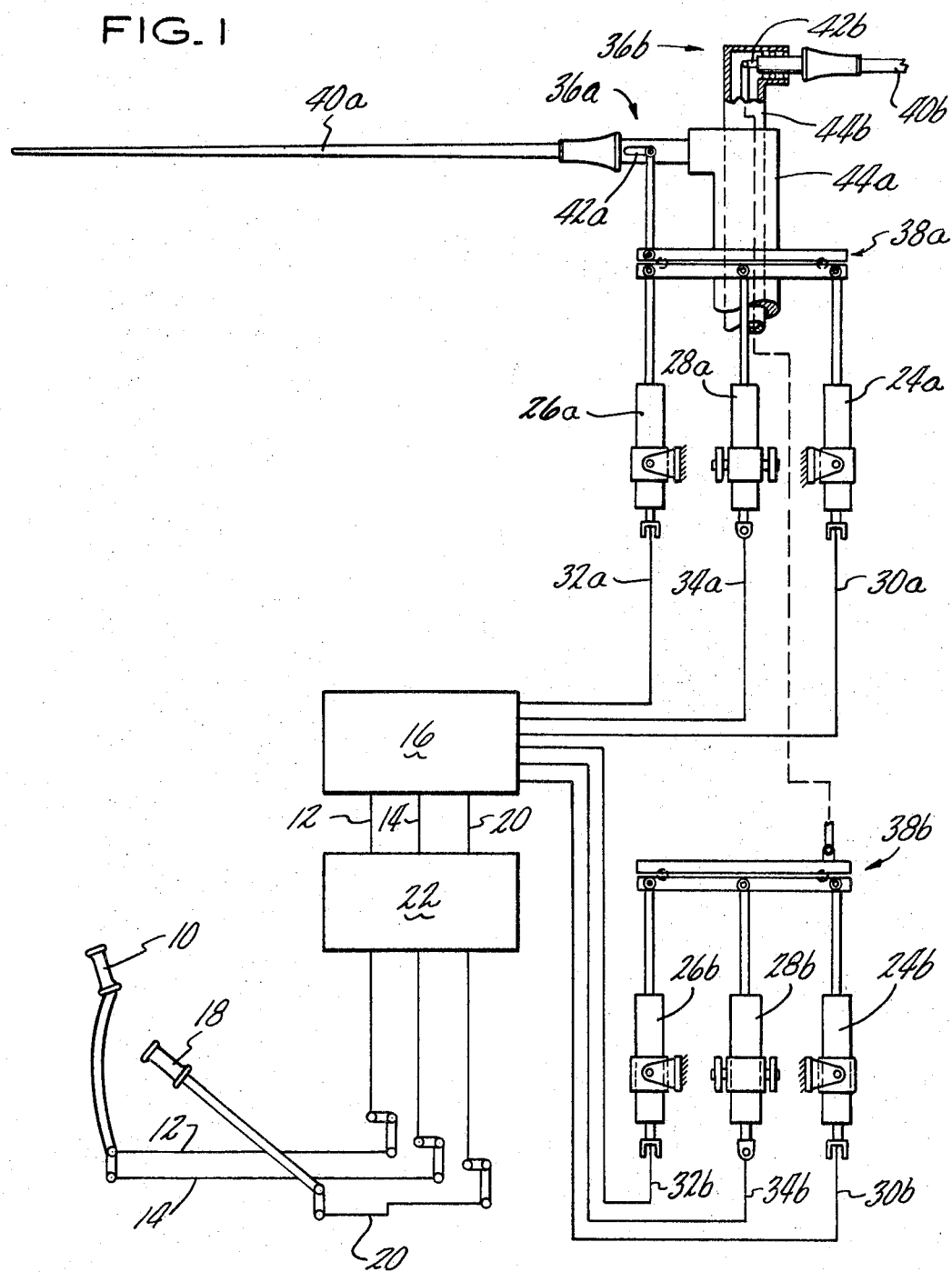
FIG. 1 is a schematic showing the interconnections of the collective and cyclic pitch control sticks with the blades of a coaxial rigid rotor system.

Reference to FIG. 1 shows a control system for operating the blades of a coaxial rigid rotor in schematic form. A conventional cyclic stick 10 is coupled by cyclic control rods 12 and 14 to a mechanical mixing unit 16. A conventional collective stick 18 is also coupled by means of collective control rods 20 to the mixing unit 16.

If desired, automatic stabilization or navigation signals can be added differentially with the cyclic and collective stick commands by means of a set of auxiliary servos generally designated by the numeral 22.

The mixing unit 16 combines the collective and cyclic pitch commands in a form which is suitable for operating the lateral servos 24 and 26 and the longitudinal servos 28 of each of the rotor systems. The mixing unit 16 and the main rotor servos are interconnected by linkages 30, 32 and 34. Corresponding actuators and control rods for the respective rotors are designated by the same numbers with the suffix *a* referring to the lower rotor 36a and the suffix *b* referring to the upper rotor 36b. In general statements applicable to both rotors, the suffixes are omitted.

While the convention is not uniform it should be understood that a reference to lateral servos is a reference to those servos which cause the blade pitch to change cyclically in such a manner that rolling moments about the longitudinal axis are generated. Correspondingly, a reference to longitudinal servos is a reference to the servos which cause the blade pitch to change cyclically in such a manner that pitching moments about the lateral axis of the aircraft are generated.

The cyclic and collective pitch commands are transmitted to the blades of each rotor by means of conventional swash plates 38 having a stationary plate connected with the servos 24, 26, 28 and a rotating plate connected to the rotor blades 40 by means of a pitch change horn 42. The pitch change horns form a radius arm from the blade feathering axes and permit the pitch of the blades to be varied by rotating the blades about the feathering axes. There are no hinges or flexing members which permit flapping or lead-lag motions of the blade with respect to the rotor hub. It is this construction which characterizes the rigid rotor and which permits the rotor to carry a greatly offset thrust vector. While only one blade is shown for each rotor, it should be understood that each rotor comprises at least three rigidly mounted blades.

As shown schematically the connections between the swash plate 38a and the blades 40a of the lower rotor are external of the rotor shaft 44a. The connections between swash plate 38b and the blades 40b of the upper rotor are shown schematically within the rotor shaft 44b for the sake of simplicity. A detailed construction of a coaxial rotor system with independently variable swash plates is shown in the cited U.S. Pat. No. 3,409,249 to Bergquist et al.

The rotors 36 in FIG. 1 are shown with the blades 40 extending in the lateral directions. Blade 40a should be considered as extending from the right-hand side of the aircraft and rotating counterclockwise as viewed from above and blade 40b extending to the left-hand side of the aircraft and rotating clockwise. While the lateral servos 24 and 26 are actually shown in a vertical plane defined by the rotor blades 40 it will be understood that in actuality the servos may be shifted about the rotor in the direction of blade rotation so that the push rod connections to the leading edge pitch change horns 42 would not introduce cross coupling between the lateral and longitudinal cyclic pitch commands. With such positioning of the servos, the differential operation of the lateral servos 24 and 26 would produce a tilting of the swash plate 38 which introduces pure lateral cyclic pitch and consequently a rolling moment about the longitudinal axis of the aircraft. In order to change the collective pitch of the blades both the lateral servos 24 and 26 and the longitudinal servo 28 must be actuated in unison to raise or lower the swash plate 38.

Figure 2:
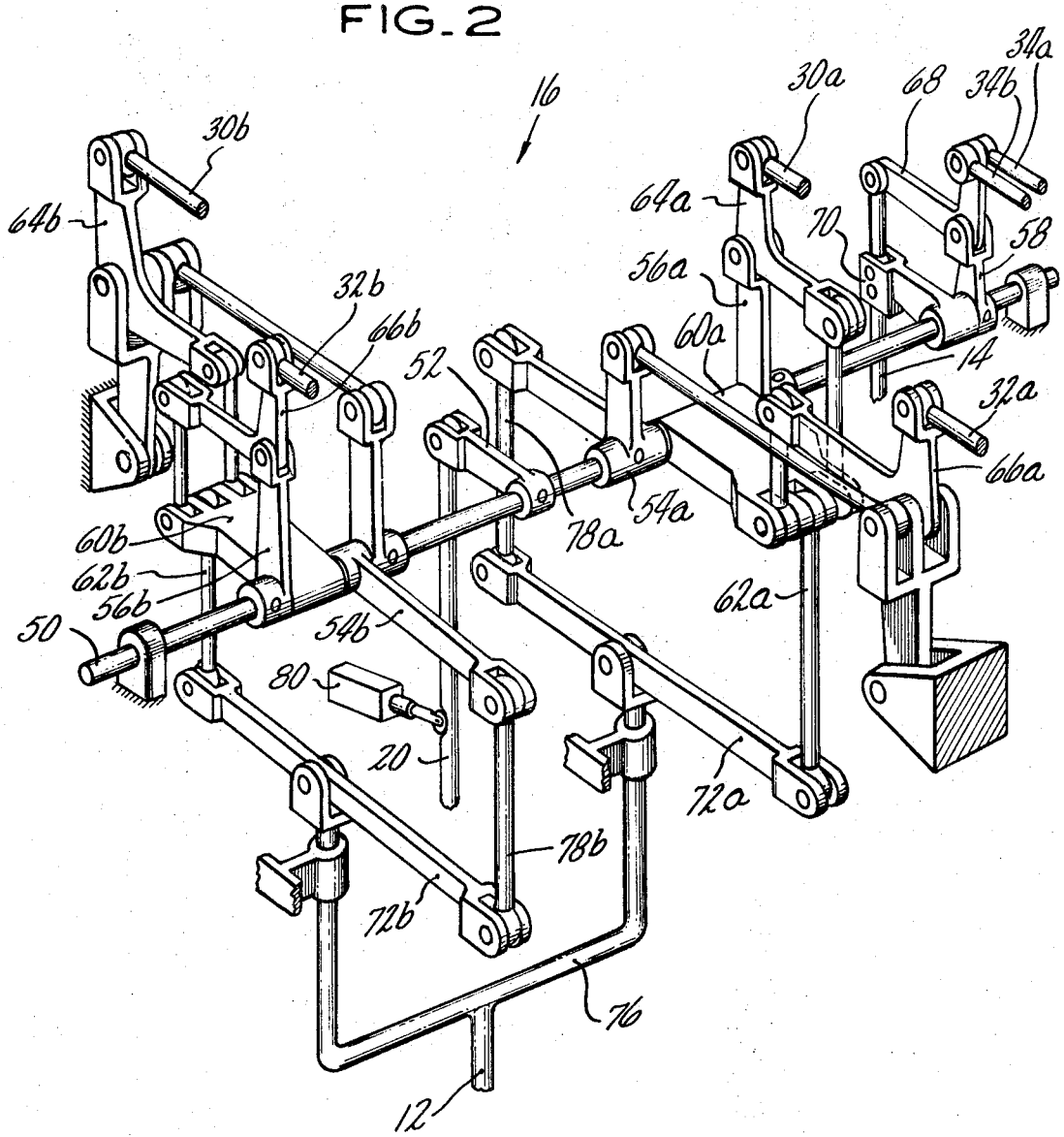
FIG. 2 is the view of a mixing mechanism which combines the collective and cyclic pitch commands for the helicopter having two rigid rotor systems employing this invention.

Reference to FIG. 2 shows the mixing unit 16 in greater detail. It should be remembered that the general function of the mixing unit 16 is the translation of the cyclic and collective pitch commands generated by the control sticks 10 and 18 in FIG. 1 into displacements which can be utilized by the three swash plate servos of each rotor. To this end the mechanism shown in FIG. 2 provides the necessary differential actuation of rods 30 and 32 in response to a displacement of lateral cyclic control rod 12 and actuation of rods 34 in response to a displacement of longitudinal cyclic control rod 14. Additionally, the mechanism actuates rods 30, 32, and 34 in response to an input motion of collective control rod 20. It is also an important feature of this invention that the mixing unit 16 increases lateral cyclic pitch from zero as the collective pitch decreases from a nonzero setting to laterally shift the lift vectors in a controlled manner on the advancing blades. This variation of collective and lateral cyclic pitch is referred to as a nondirect proportionality and should be distinguished from a direct proportionality in which an incremental change in collective pitch from a zero value is accompanied by a proportional change in lateral cyclic pitch from zero value. Such directly proportional coupling is known in the prior art as represented by U.S. Pat. No. 3,199,601 to Dean et al. For the purpose of definition and clarification, an increase in lateral cyclic pitch causes a decrease in the pitch of an advancing blade. This definition is the commonly used mathematical definition. A zero value of collective pitch is defined as that collective pitch which produces a thrust vector having a zero magnitude.

The mixing unit 16 consists basically of a shaft 50 pivotally mounted in the aircraft and a duplicate set of linkages for each rotor. Again corresponding links for the different rotor systems are designated by the same numerals with suffixes a and b to distinguish between the respective rotors. Cranks 52, 54, 56, and 58 are pinned for rotation to rod 50. Arm 60 is pivotally mounted on rod 50 and the pivotal motion of arm 60 about rod 50 is controlled by rod 62. It will be readily understood that a displacement of rod 62 will cause rods 30 and 32 to be actuated differentially by means of the differential tilting of bellcranks 64 and 66. The differential actuation or rods 30 and 32 is precisely that motion which is necessary to tilt swash plate 38 (FIG. 1) and introduce lateral cyclic pitch changes to the rotor blades 40. Consequently, rod 62 is associated with the lateral cyclic pitch commands. By means of the combined operation of pinned crank 58, bellcrank 68, and arm 70 which is pivotally mounted on shaft 50, longitudinal cyclic control rod 14 actuates rod 34 and longitudinal servo 28 to tilt the swash plate 38 and introduce longitudinal cyclic pitch.

If rod 62 could be held fixed while crank 52 is rotated by collective control rod 20, the cooperative operation of cranks 54 and 56 together with bellcranks 64 and 66 would cause rods 30 and 32 to move in unison rather than differentially. Simultaneously, if longitudinal cyclic control rod 14 is held fixed, the cooperative action of cranks 58 and 68 and pivotable arm 70 causes rod 34 to also move in the same direction on rods 30 and 32 for collective pitch change. As described more completely in U.S. Pat. No. 3,199,601 to Dean et al., various directly proportional collective coupling factors can be introduced between the collective and cyclic channels by simply varying the radii of the various cranks.

From this brief description it will be understood that with proper positioning of the swash plate servos and no cross coupling, if rods 62 could be moved by themselves, pure lateral cyclic pitch would be introduced in the rotors by means of differential actuation of rods 30 and 32. A motion of rod 14 by itself would move rods 34 and introduce a pure longitudinal cyclic pitch change in the rotors. If rods 62 and rod 14 could be held fixed, a displacement of rod 20 would move rods 30, 32, and 34 collectively and consequently introduce a collective pitch change to the rotor blades. It will be noted, however, that the displacement of rod 62 is controlled by the differential link 72. Differential link 72 is in turn controlled by the displacement of lateral cyclic control rod 12 together with yoke 76 and also by collective coupling rod 78. Since cranks 52 and 54 are pinned to shaft 50, actuation of collective rod 20 will also superimpose a small increment of lateral cyclic on the collective pitch command by means of the displacement of rod 78, differential link 72 and rod 62.

It will be noted that an upward displacement of rod 12 produces a corresponding upward displacement of both rods 62a and 62b. Consequently, the differential operation of rods 30 and 32 of the respective rotors will be ganged or in-phase, that is rod 30a and 30b will move in one direction while rods 32a and 32b will move in the opposite direction. The tilting of swash plate 38a caused by this motion of rods 30a and 32a may be said to have the same sense as the tilting of swash plate 38b caused by similar motions of rods 30b and 32b since these motions produce roll moments having the same sense about the longitudinal axis of the aircraft. Such in-phase roll moments are the result of shifting the thrust vectors of the rotors in the same direction to positions asymmetric with respect to the aircraft for control of the attitude or maneuvering of the aircraft.

On the other hand, in order to symmetrically offset the lift vectors on the advancing blades as taught in U.S. Pat. No. 3,409,249, it is necessary to introduce lateral cyclic pitch commands which cause tilting of the swash plates by substantially equal amounts but in opposite senses because the advancing blades of the respective rotors lie on opposite lateral sides of the aircraft. For this reason it will be noted that the collective coupling rods 78 cause differential actuation of rods 62 in response to a displacement of collective control rod 20. It is this differential actuation of rods 62 and the associated differential tilting of swash plates 38 which is frequently referred to as differential lateral cyclic pitch. The term differential lateral cyclic pitch is an anomaly in view of the mathematical definition of lateral cyclic pitch given above since this differential swash plate tilting actually increases the lateral cyclic pitch on both of the counterrotating rotors. As mentioned in the cited U.S. Pat. No. 3,409,249, the lift vectors have a tendency in the uncontrolled state to shift outwardly on the advancing blades with increasing speed. Consequently, the collective-to-lateral-cyclic coupling introduced for control of the offset restricts this shifting tendency by increasing lateral cyclic pitch with the corresponding decrease in collective pitch. The lift vector will accordingly be positioned at a station on the blade inboard of that which the vector would otherwise assume. The amount of collective-differential lateral cyclic coupling may be varied by changing the radius of the arms on the bellcranks 52 or 54 or by shifting the pivot point of yoke member 76 on differential link 72.

For reasons to be described hereinafter, a locking or restraining mechanism 80 which may consist of electrically actuated plunger or a spring-loaded detent is mounted immediately adjacent the collective control rod 20 to engage and restrain the control rod at a preselected collective pitch.

OPERATION

Figure 3:
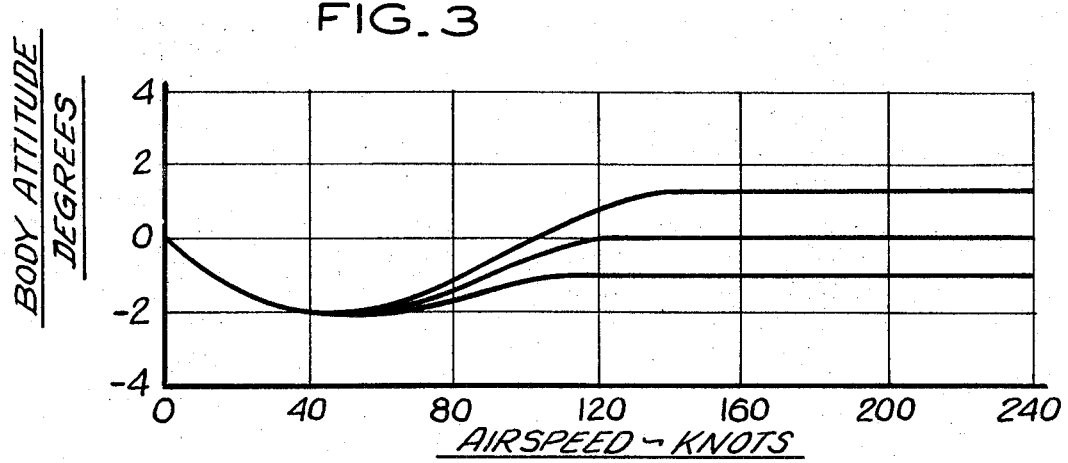
FIG. 3 is a graph showing the relationship between fuselage attitude and forward speed in straight-and-level flight for helicopters of various gross weights.
Figure 4:
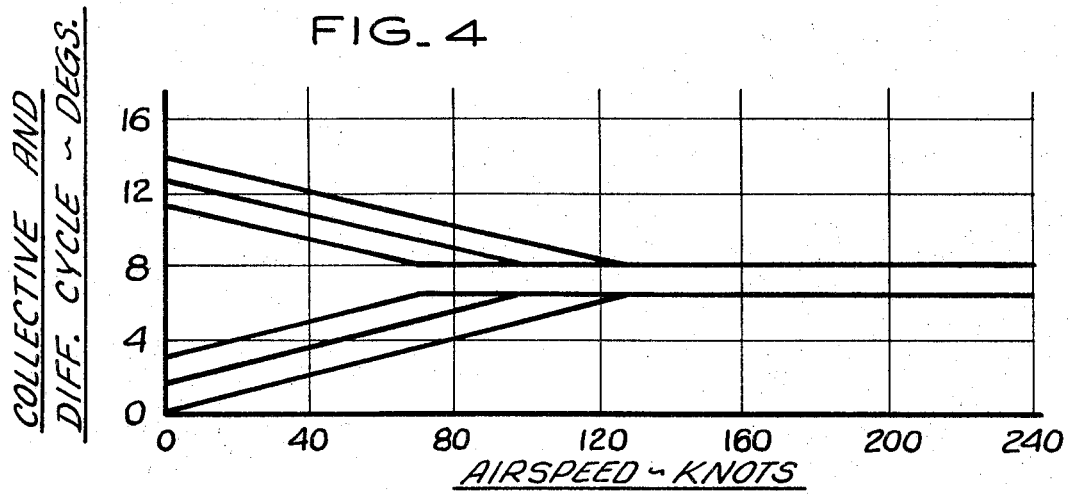
FIG. 4 is a graph showing the functional relationship of collective pitch and coupled lateral cyclic pitch which produces rotor lift vector offset and the variation of collective and coupled cyclic pitch with forward speed.

A better understanding of the utility of the disclosed apparatus and its method of operation may be obtained from an examination of FIGS. 3 and 4.

FIG. 3 shows the variation of forward speed and fuselage attitude for an aircraft having coaxial rigid rotors and an auxiliary propulsion device such as disclosed in the cited U.S. Pat. No. 3,409,249. At low forward speed the fuselage is tilted forward or negatively with the rotor thrust vectors similarly inclined to accelerate from the hovering condition. As the speed is increased, the nose of the aircraft is gradually pitched upward at the higher forward speed. As all three traces on the graph indicate, the aircraft can be held at a fixed attitude in the high speed flight mode. The three different fixed attitudes represent attitudes of a given aircraft at various gross weights. A higher fixed attitude is required for greater gross weight if straight-and-level flight is to be maintained.

FIG. 4 should be read in conjunction with FIG. 3 and shows the variation with airspeed of collective pitch (upper traces) and the lateral cyclic pitch (lower traces) coupled with collective pitch according to the teachings of this invention. The relationship of the collective-to-lateral coupling is clearly a nondirect proportionality. As collective pitch decreases from the hovering value, the amount of lateral cyclic pitch command increases. The various ranges of collective pitch in the hovering and low speed range again correspond to aircraft having various gross weights. Ideally, coupled lateral cyclic should always increase from zero pitch at hovering conditions, but due to the proportional dependency on collective pitch, small variations with gross weight are experienced at low speeds. These small variations are tolerable and a worthy compromise in view of the simplification offered by the collective-to-lateral coupling system. It may be desirable in some cases, however, to additionally provide a trim device for incremental adjustments in the amount of coupled lateral cyclic pitch. Such a device could be incorporated by making coupling rod 78 an extendible rod or by providing a shiftable connection between yoke 76 and differential link 72. The trimming could be accomplished by the pilot or a suitable sensing system.

It will be noted that the collective pitch may be set at a single value in the higher speed regimes regardless of the aircraft gross weight. The locking mechanism 80 shown in FIG. 2 is positioned with respect to the collective pitch rod 20 to hold the collective pitch of the high speed value shown in FIG. 4. It may alternately be desirable to have the mechanism 80 adjustable so that the steady state value of collective pitch at high speed can be changed. Such an adjusting feature might be particularly preferable where a lateral cyclic trim device is also present. While collective pitch is held constant, the forward speed of the aircraft in the higher speed ranges would be essentially regulated by modulating the thrust of an auxiliary propulsion device. It will be understood that any form of auxiliary propulsion device such as a jet engine or pusher propeller could be employed.

With the collective pitch fixed at the higher forward speeds, the aircraft with the rigid coaxial rotor system is flown with the cyclic stick 10 in FIG. 1 in essentially the same manner as a fixed wing aircraft. The variation in the rotor angle of attack and consequently the resultant lift of the coaxial rotor system is accomplished by varying the forward propulsion force of the pusher propeller and the fuselage attitude as shown in FIG. 3. The fuselage angle is controlled in turn from the cyclic stick which generates pitching moments about the lateral aircraft axis. The cyclic stick also introduces lateral cyclic pitch on both rotors to generate roll moments for aircraft maneuvering. Yawing motions can be controlled by various means such as taught in U.S. Pat. No. 3,409,249 or an auxiliary control surface such as a rudder.

It will be understood that the invention is not limited to the particular embodiments as shown and described. For example, while the embodiment in FIG. 1 discloses a coaxial rotor system it is also quite possible to incorporate the invention in an aircraft which has two rotors laterally offset from each other. In still another embodiment it is possible that a single rigid rotor could employ the invention in conjunction with a second lift device such as a wing that would produce a roll moment cancelling the moment generated by the laterally offset lift vector. It is also apparent that various modifications or substitutions for the particular control linkages and rotor systems may be made without departing from the scope of the invention as defined by the following claims.

I claim:

1. A control device for an aircraft having a rigid rotor with variable pitch blades capable of sustaining a steady offset rotor thrust vector comprising:

first means for varying the pitch of the blades cyclically to control the lateral offset of the rotor thrust vector from the center of the rotor on the advancing blades of the rotor;

second means for varying the pitch of the blades collectively to increase or decrease the magnitude of the rotor thrust vector; and third means coupling the second means to the first means for varying the cyclic pitch of the rotor in nondirect proportional relationship with the collective pitch of the rotor whereby a decrease in collective pitch is accompanied by a controlled increase in the amount of cyclic pitch.

2. The control device of claim 1 further including fourth means operatively associated with the second means for locking the second means and the third means at a predetermined collective pitch.

3. A control device for an aircraft having a pair of counterrotating thrust producing rotors with at least three variable pitch blades rigidly supported from a rotor hub for producing steady offset rotor lift vectors comprising:

first means connected with the blades of the one rotor for cyclically varying the pitch to control the lateral offset of the lift vector on the advancing blades of the one rotor;

second means connected with the blades of the other rotor for cyclically varying the pitch to control the lateral offset of the lift vector on the advancing blades of the other rotor;

third means connected with the blades of each rotor for collectively varying the pitch of the blades of each rotor; and fourth means coupling the first, second and third means for varying the cyclic pitch of the two rotors to control the lateral offset of the lift vectors of the rotors on the advancing blades in response to the collective pitch variation of third means.

4. The device of claim 3 wherein the fourth means varies the cyclic pitch in increments proportional to the collective pitch variations.

5. The device of claim 4 wherein the fourth means varies the cyclic pitch in a nondirect proportional relationship with the collective pitch of the blades to control the offset of the lift vectors in opposite lateral directions.

6. Apparatus for controlling the thrust vectors in an aircraft rotor system having two counterrotating rotors, each rotor having at least three blades extending rigidly from a rotor hub comprising:

first means for variably positioning the thrust vector of the one rotor over the advancing blades of the one rotor and along a first lateral radial of the aircraft rotor system;

second means for variably positioning the thrust vector of the other rotor over the advancing blades of the other rotor and along a second lateral radial of the aircraft rotor system;

third means connected to both rotors for varying the magnitude of the thrust vectors of both rotors in unison; and fourth means connecting the first and second means to the third means for operating the first and second means in response to the third means and thereby variably positioning the thrust vectors of the respective rotors along the radials as a function of the magnitude of the thrust vectors.

7. Apparatus of claim 6 wherein:
the first means include means for cyclically varying the lateral cyclic pitch of the blades of the one rotor;
the second means include means for cyclically varying the lateral cyclic pitch of the blades of the other rotor;
the third means include means for varying the collective pitch of both rotors in unison; and
the fourth means couple the collective pitch means to the lateral cyclic means to vary the lateral cyclic pitch on both rotors in a nondirect proportional relationship with collective pitch.

8. Apparatus of claim 7 wherein the fourth means provide a nondirect proportional relationship in which the coupled lateral cyclic pitch increases from a zero value as collective pitch decreases from a value greater than zero.

9. In an aircraft, the combination including:
two counterrotating rigid rotors positioned symmetrically with respect to the longitudinal aircraft axis to present advancing blade patterns on opposite lateral sides of the aircraft;
first lateral cyclic means connected with the rotor blades for cyclically changing blade pitch of both rotors and establishing symmetrically positioned thrust vectors laterally offset from the rotor axes on the advancing blades of the respective rotors;
collective means also connected with the rotor blades for collectively changing the blade pitch of both rotors to increase or decrease the combined thrusts of the rotors; and
collective coupling means connecting the first lateral cyclic means to the collective means for rendering the symmetric lateral offset of the thrust vectors a function of the collective pitch.

10. The combination of claim 9 wherein the rotors are coaxially mounted.

11. The combination of claim 9 wherein the collective coupling means renders the lateral cyclic pitch a nondirect proportional function of the collective pitch.

12. The combination of claim 11 wherein the coupled lateral cyclic pitch is substantially zero at the value of collective pitch for hovering.

13. The combination of claim 9 further including second lateral cyclic means connected with the rotor blades for cyclically changing the blade pitch of both rotors and establishing thrust vectors positioned asymmetrically with respect to the rotor axes on the advancing or retreating blades of the rotors thereby generating rolling moments for aircraft control.

14. The combination of claim 9 further including:
restraining means operatively associated with the collective means for holding the collective pitch of the rotors and consequently the coupling means at a preselected position; and
propulsion means independent of the counterrotating rotors for regulating the forward speed of the aircraft.

15. A method of flying an aircraft having a propulsion device and two lift-producing devices, the first lift-producing device being a rotor having variable pitch blades capable of sustaining a thrusting force offset from the rotor axis comprising:
causing the rotor to rotate;
increasing the pitch of the rotor blades collectively until the aircraft rises;
providing a propulsive force from the propulsion device to generate forward speed of the aircraft;
decreasing the pitch of the rotor blades collectively as forward speed of the aircraft is generated;
restricting the offset of the thrusting force of the rotor from the center of the rotor toward the tips of the advancing blades of the rotor simultaneously with the decreasing of blade pitch; and
balancing the rolling moment caused by the offset thrusting force with an equal and opposite rolling moment from the second lift-producing device.

16. A method of controlling an aircraft having a forward propulsion device and two lifting rotors, each rotor having at least three blades adjustable for cyclically and collectively varying the pitch, the blades being rigidly supported from a rotor hub for carrying a rotor thrust vector at positions offset from the rotor axis comprising the steps of:
counterrotating the rotors;
adjusting the collective pitch of the blades on each rotor to generate lift for supporting the aircraft;
regulating the propulsive force from the forward propulsion device to provide the forward speed of the aircraft;
decreasing the collective pitch as the forward speed of the aircraft increases; and
increasing the lateral cyclic pitch of each rotor simultaneously with the decrease in collective pitch to restrict the outward lateral displacement of the lift vectors over the advancing blades of the respective rotors.

17. The method of claim 16 further including the step of rendering the vector-restricting lateral cyclic pitch dependent upon the collective pitch of the rotors.

18. The method of claim 17 including the further step of differentially combining additional lateral cyclic pitch with the pitch of the rotor blades to generate aircraft rolling moments for aircraft control.

19. The method of claim 17 including the additional step of holding the collective pitch of the rotors constant above a preselected forward speed of the aircraft.

20. The method of claim 19 including the further step of superimposing longitudinal cyclic pitch on the pitch of the rotor blades to vary the angle of attack of the rotors and consequently lift generated by the rotors while the collective pitch of the rotors is held constant.